MEMORY

Filed May 17, 1962

INVENTORS
LESLIE L. BURNS, JR.
& GERARD A. ALPHONSE
BY Samuel Cole
ATTORNEY 3,172,085

MEMORY

Leslie L. Burns, Jr., Princeton, N.J., and Gérard A. Alphonse, New York, N.Y., assignors to Radio Corporation of America, a corporation of Delaware Filed May 17, 1962, Ser. No. 195,552
14 Claims. (Cl. 340—173.1)

Figures 1, 2, 3:
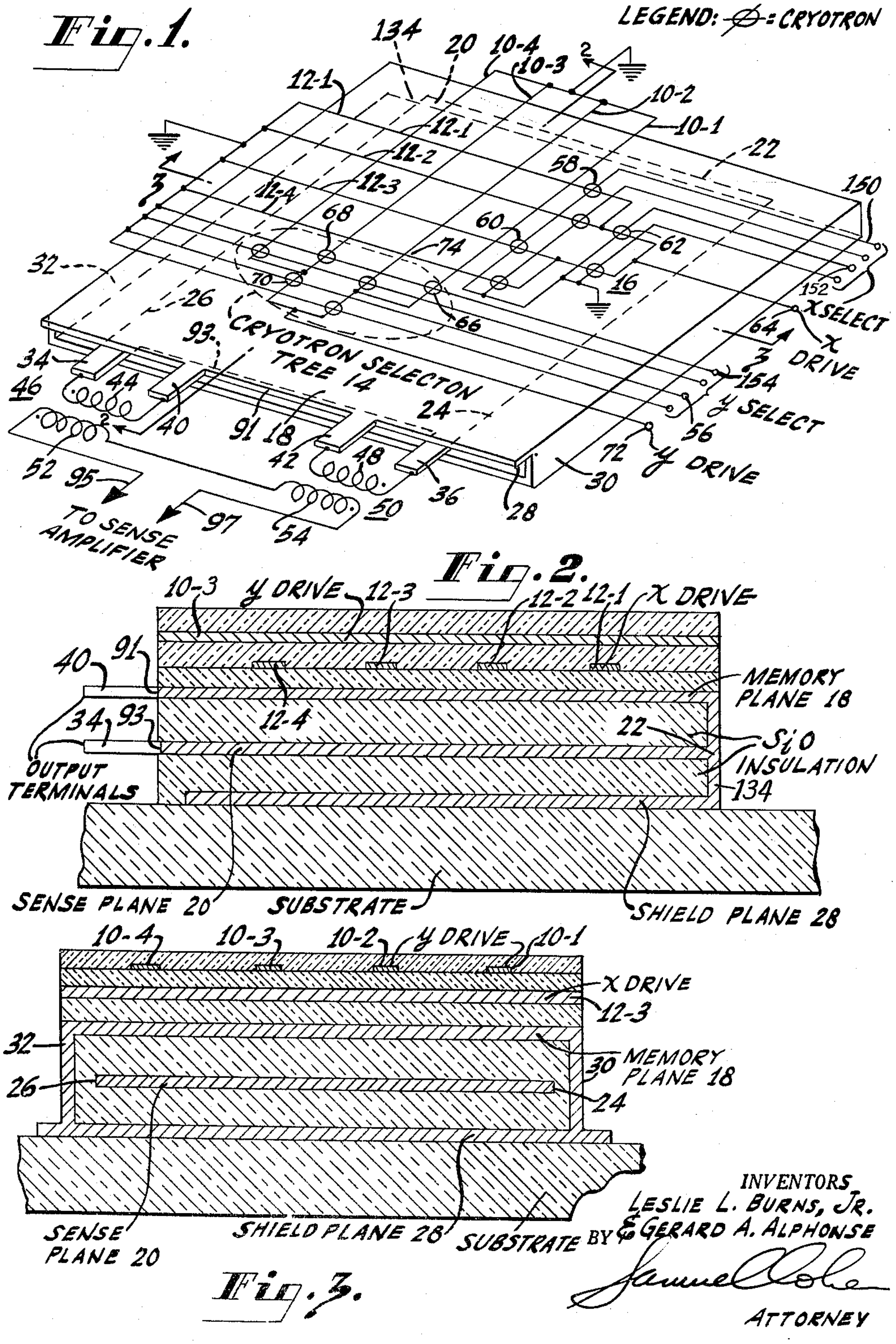

This invention relates to an arrangement for sensing the output of a superconductor memory. It is an improvement over the sensing arrangement described in copending application, Serial No. 135,045, filed August 30, 1961, by Gérard A. Alphonse and assigned to the same assignee as the present invention.

In the copending application above, a superconductor memory is described which includes a superconductor memory plane and drive lines for the memory located on one side of the plane. The drive lines include a group of $x$ drive wires which extend in one direction and a group of $y$ drive wires which extend in the other direction. The intersections between $x$ and $y$ drive wires are memory locations.

The sensing arrangement for the memory above includes a second superconductor plane, termed hereafter a "sense" plane, arranged parallel to the memory plane and located on the side thereof opposite from the drive wires. The second plane is joined to the memory plane along an edge and forms therewith a parallel plane TEM transmisison line. When one of the memory locations is driven normal, an electromagnetic wave is induced in the transmission line and an output may be obtained at terminals connected to the edges of the two planes opposite the ones where they join. The two remaining edges of each plane are not joined to one another.

As mentioned in the application above, it is possible for a drive wire which passes over an edge of the memory plane not joined to the sense plane to induce a magnetic field in the space between the two planes and in this way induce a spurious electromagnetic wave (noise) at the output terminals of the two planes. This effect is now known as "edge-excitation." It may be overcome by arranging the drive lines to cross the edges exactly perpendicularly. However, this requires very precise and therefore expensive construction techniques. If the sense plane is joined to the memory plane at the former's opposite open edges to prevent edge-excitation, the transmission line does not propagate, as may be implied from the discussion in columns 3 and 4 of the copending application above.

The object of the present invention is to provide an improved sensing arrangement for a cryoelectric memory, improved in the sense that edge-excitation is eliminated.

In the memory of the present invention, the sense plane is located beneath and parallel to the memory plane. As in the sensing arrangement of the Alphonse application above, the sense plane is joined to the memory plane at one edge. However, in addition, the structure also includes a third superconductor plane known as a "shield plane." This plane is located parallel to the sense plane and on the side thereof opposite the memory plane. The shield plane is folded up over the two opposed open edges of the sense plane but remains spaced from these edges. The folded up portion of the shield plane is joined to the corresponding opposed edges of the memory plane and is also joined to the same edge of the memory plane as the sense plane. The output from the memory is available at the edges of the sense and memory planes, respectively, opposite the edges which are joined.

The invention is described in greater detail below and is shown in the following drawing of which:

FIG. 1 is a perspective schematic representation of a memory of the present invention; and FIGS. 2 and 3 are sections along lines 2—2 and 3—3, respectively, of the structure shown in FIG. 1.

Throughout the figures similar reference numerals are applied to similar elements. Also, although not shown, it is to be understood that the memory discussed is maintained at a low temperature, such as a few degrees Kelvin, at which superconductivity is possible.

A superconductor memory according to the present invention may have a large number of storage locations. For example, there may be 10,000 or more such locations, however, for purposes of the present discussion a memory having only 16 such locations is illustrated. The principles of operation of a smaller memory are the same as those of the larger one.

The memory of FIGS. 1–3 include four $y$ drive wires 10–1 to 10–4 and four $x$ drive wires 12–1 to 12–4. These wires are shown insulated from one another and from the memory plane in FIGS. 2 and 3, however, although present, no insulation is shown in the schematic perspective view of FIG. 1. The $y$ drive wires may be connected to a cryotron selection tree 14 and the $x$ drive wires may be connected to a cryotron selection tree 16. These trees are shown in FIG. 1 but are omitted from FIGS. 2 and 3.

A superconductor memory plane 18 is located beneath the drive wires. A second conductive plane 20 which is preferably but not necessarily a superconductor is arranged parallel to the memory plane 18. The second plane 20 is the sense plane. The sense plane is joined at one edge 22 to the superconductor memory plane 18. At its other edges 24 and 26 and 93 the sense plane is not joined to the memory plane.

A third plane 28, hereafter termed a "shield plane," is parallel to and located beneath the sense plane 20. Three edges 30, 32 and 134 of the memory plane 18 are folded down and joined to the shield plane 28. The folded down sections 30 and 32 are spaced from the respective opposite edges 24 and 26 of the sense plane.

One pair of output terminals 34 and 36 extend from the opposite edges 26 and 24, respectively, of the sense plane 20. Another pair of output terminals 40 and 42 extend from the memory plane 18. Terminals 34 and 40 are connected to one another by the primary winding 44 of a transformer 46. Terminals 36 and 42 are connected by the primary winding 48 of a transformer 50. The secondary windings 52 and 54 of the respective transformers are connected in series and produce an output which is applied to the sense amplifier (not shown).

In the operation of the memory of FIG. 1, information may be written into or read out of the memory by applying appropriate signals to particular ones of the $x$ and $y$ select input terminals. For example, assume that signals (currents) are applied concurrently to select input terminals 150, 152, 154 and 56. The signal applied to terminal 150 drives cryotrons 58 and 60 normal. The signal applied to terminal 152 drives cryotron 62 normal. The only path therefore which remains superconducting between the $x$ drive terminal 64 and ground is the one leading through $x$ drive wire 12–4. In a similar manner, the signals applied to terminals 154 and 56 drive cryotrons 66, 68 and 70 normal. The only superconducting path remaining for a drive current applied to $y$ drive terminal 72 is the one through $y$ drive wire 10–2. Under these conditions, the memory location selected is the one at the intersection of $x$ and $y$ drive wires 12–4 and 10–2, that is, location 74.

If the portion of the memory plane beneath intersection 74 is driven normal, the magnetic field produced by the two drive wires penetrates the superconductor plane and causes an electromagnetic field to propagate along the TEM parallel plane transmission line 18, 20. Output signals appear at the primary windings 44 and 48. The transformers 46 and 50 are so wound that these signals add at the secondary windings 52, 54 and produce a relatively large amplitude signal which is applied to the sense amplifier. The latter may be a pulse type amplifier (not shown).

An important advantage of the sensing arrangement described over the one of the Alphonse patent discussed above is that the TEM parallel plane transmission line is completely shielded at its edges 24–26 by the folded portions 30 and 32. Thus, the "half-select" signals applied to terminals 150, 152, 154 and 56 cannot induce any noise, that is, spurious electromagnetic wave propagation due to edge effects, in the TEM transmission line. Tests indicate that with this arrangement edge-excitation is eliminated completely.

A second advantage of the present system resides in the arrangement of the output terminals. It is found that with a memory plane of finite size, the sense signal amplitude along the edges 91, 93 (front edges as viewed in FIG. 1) of the parallel plane transmission line is not uniform. For example, it is found that when a memory location close to a right side such as 30 of the memory plane 18 is driven normal, the output signal across front edges 91, 93 is of greater amplitude near right edge 24 of the parallel plane line than near left edge 26 of the line. The use of spaced pickup points (output terminals) along edges 91, 93 gives a more uniform output signal from the memory, that is, regardless of the memory location driven normal, the output signal available at output leads 95, 97 is of about the same amplitude. For a very wide plane, three or more sets of output terminals spaced along edges 91, 93 may be used. As in the embodiment of FIG. 1, the primary windings should be so arranged that the output signals induced in the secondary windings are additive in the same polarity.

What is claimed is:

1. A superconductor memory plane which includes a plurality of storage locations; a sense plane parallel to the memory plane and joined at one edge thereto, said two planes forming together an electromagnetic wave transmission means; and a third shield superconductor plane joined to the sense plane at said one edge thereof, and said shield and memory planes enclosing at least a major portion of said sense plane.

2. A superconductor memory plane which includes a plurality of storage locations; a sense superconductor plane parallel to the memory plane and joined at one edge thereto, said two planes forming together a TEM parallel plane electromagnetic wave transmission means; and a third shield superconductor plane joined to the sense plane at said one edge thereof, and said shield and memory planes enclosing at least a major portion of said sense plane.

3. A parallel plane tubular structure formed of superconductor material and closed at one end, one said plane comprising a superconductor memory plane having a plurality of storage locations; a third superconductor plane arranged parallel to said two planes extending into the tubular structure and joined thereto at the closed end thereof; and output terminals at the open end of said tubular structure, one at said third plane and one at said memory plane.

4. A parallel plane tubular structure formed of superconductor material and closed at one end, one said plane comprising a superconductor memory plane having a plurality of store locations; a third superconductor plane arranged parallel to said two planes and extending into the tubular structure and joined thereto at the closed end thereof; and two pairs of output terminals at the open end of said tubular structure, one pair at opposite edges of said third plane and one pair at said memory plane.

5. In combination, a superconductor memory plane having a plurality of storage locations; a sense plane joined solely at one edge to the memory plane and arranged parallel thereto, said two planes forming together a parallel plane transmission line, and a plurality of pairs of output terminals, each pair including one terminal connected to the sense plane and one terminal connected to the memory plane, said pairs being distributed along the edge of the two planes opposite the one at which they join.

6. A parallel plane tubular structure formed of superconductor material and closed at one end, one said plane comprising a superconductor memory plane; $x$ and $y$ drive lines located on one side of the memory plane outside of the tubular structure; a conductive third plane arranged parallel to said two planes extending into the tubular structure and joined thereto at the closed end thereof; and a plurality of pairs of output terminals at the open end of said tubular structure, one terminal of each pair being connected to the third plane and the other terminal of each pair being connected to said memory plane, said terminals being distributed along the extent of said open end of said structure.

7. A parallel plane tubular structure formed of superconductor material and closed at one end, one said plane comprising a superconductor memory plane; a conductive third plane arranged parallel to said two planes extending into the tubular structure and joined thereto at the closed end thereof; a plurality of pairs of output terminals at the open end of said tubular structure, one terminal of each pair being connected to the third plane and one terminal of each pair being connected to said memory plane, said terminals being distributed along the extent of said open end of said structure; and a plurality of transformers, each primary winding of a transformer being connected to a different pair of output terminals, and all secondary windings of said transformers being connected in series in such manner that the output signals developed at the secondary windings add in the same polarity.

8. A parallel plane tubular structure formed of superconductor material and closed at one end, one said plane comprising a superconductor memory plane; a third plane formed of conductive material arranged parallel to said two planes extending into the tubular structure and joined thereto at the closed end thereof; and output terminals at the open end of said tubular structure, at least one at said third plane and at least one at said memory plane.

9. A parallel plane tubular structure open at one end comprising, a superconductor memory plane and a superconductor shield plane; and a conductive sense plane extending into the tubular structure and spaced from the memory and sense planes at two opposite edges of the sense plane which are parallel to the axis of the tubular structure.

10. A parallel plane tubular structure open at one end comprising, a superconductor memory plane and a superconductor shield plane; a conductive sense plane extending into the tubular structure and spaced from the memory and sense planes at the two opposite edges of the sense plane which are parallel to the axis of the tubular structure; and output means coupled to the sense plane.

11. In a thin film cryoelectric memory, in combination, a superconductor memory plane; drive lines located on one side of the memory plane; a superconductor shield plane located on the other side of the memory plane and joined to the memory plane along three edges, said memory plane and shield plane together forming a tubular structure which is open at one end; a conductive sense plane extending into the tubular structure and arranged parallel to the memory plane, said sense plane being spaced from the tubular structure at the edges thereof which are parallel to the axis of the tubular structure; and means coupled to the sense plane for receiving a sense signal when the magnetic field produced by drive lines penetrates through the memory plane.

12. A thin film cryoelectric memory, comprising, in combination, a superconductor memory plane; $x$ and $y$ drive lines located on one side of the memory plane, the cross-overs of said lines defining memory locations in the memory plane; a superconductor shield plane located on the other side of the memory plane and joined to the memory plane along three edges, said memory plane and shield plane together forming a tubular structure which is open at one end; a sense plane extending into the tubular structure and arranged parallel to the memory plane, said sense plane being spaced from the tubular structure at the edges thereof which are parallel to the axis of the tubular structure; and means coupled to the sense plane for receiving a sense signal when the magnetic field due to coincident currents applied to a pair of $x$ and $y$ drive lines penetrates through the memory plane.

13. A thin-film cryoelectric memory comprising, in combination, a superconductor memory plane; $x$ and $y$ drive lines located on one side of the memory plane, the cross-overs of said lines defining memory locations in the memory plane; a superconductor shield plane located on the other side of the memory plane; a sense plane extending between the memory and shield planes and arranged parallel to the memory plane; and means coupled to the sense plane for receiving a sense signal when the magnetic field due to coincident currents applied to a pair of $x$ and $y$ drive lines penetrates through the memory plane.

14. A thin-film cryoelectric memory comprising, in combination, a superconductor memory plane; $x$ and $y$ drive lines located on one side of the memory plane, the cross-overs of said lines defining memory locations in the memory plane; a superconductor shield plane located on the other side of the memory plane; a sense plane extending between the memory and shield planes and joined along one edge to a corresponding edge of both said memory and shield planes, said sense plane being arranged parallel to the memory and shield planes; and means coupled to the sense plane for receiving a sense signal when the magnetic field due to coincident currents applied to a pair of $x$ and $y$ drive lines penetrates through the memory plane.

References Cited in the file of this patent

UNITED STATES PATENTS 2,903,656 Weisbaum ---------------- Sept. 8, 1959
2,966,647 Lentz -------------------- Dec. 27, 1960
3,086,130 Meyers et al. ------------ Apr. 16, 1963